(12) United States Patent
Anderson et al.

(10) Patent No.: US 9,266,493 B2
(45) Date of Patent: Feb. 23, 2016

(54) TWO-WAY VALVE FOR MULTI-CHAMBERED AIRBAGS

(71) Applicant: TK Holdings Inc., Auburn Hills, MI (US)

(72) Inventors: Christopher L. Anderson, Harrison Township, MI (US); James P. Karlow, Commerce Township, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 14/249,930

(22) Filed: Apr. 10, 2014

(65) Prior Publication Data

US 2014/0306433 A1    Oct. 16, 2014

Related U.S. Application Data

(60) Provisional application No. 61/810,481, filed on Apr. 10, 2013.

(51) Int. Cl.
*B60R 21/233* (2006.01)
*B60R 21/239* (2006.01)

(52) U.S. Cl.
CPC ............. *B60R 21/233* (2013.01); *B60R 21/239* (2013.01); *B60R 2021/23324* (2013.01)

(58) Field of Classification Search
CPC .................... B60R 21/233; B60R 2021/23324
USPC ......................................................... 280/729
See application file for complete search history.

(56) References Cited

U.S. PATENT DOCUMENTS

| 5,520,413 | A   |   | 5/1996  | Mossi et al. |
|-----------|-----|---|---------|--------------|
| 5,593,179 | A   |   | 1/1997  | Maruyama |
| 5,697,641 | A   | * | 12/1997 | McGee et al. ............. 280/743.1 |
| 6,059,312 | A   |   | 5/2000  | Staub et al. .................... 280/729 |
| 6,276,716 | B1  |   | 8/2001  | Kato |
| 6,419,267 | B1  |   | 7/2002  | Hashimoto et al. |
| 6,832,778 | B2  | * | 12/2004 | Pinsenschaum et al. ..... 280/739 |
| 7,000,947 | B2  |   | 2/2006  | Kumagai et al. |
| 7,192,053 | B2  | * | 3/2007  | Thomas ........................ 280/739 |
| 7,455,317 | B2  |   | 11/2008 | Bito |
| 7,543,850 | B2  |   | 6/2009  | Bachraty et al. |
| 8,002,309 | B2  |   | 8/2011  | Kim et al. |
| 8,342,573 | B2  |   | 1/2013  | Kwon |
| 8,419,050 | B2  |   | 4/2013  | Yoo |
| 8,480,122 | B2  |   | 7/2013  | Ohara |

(Continued)

FOREIGN PATENT DOCUMENTS

| FR | 2577903     | 8/1986 |
| JP | 10-100827   | 4/1998 |
| KR | 20040073017 | 8/2004 |

*Primary Examiner* — Karen Beck
(74) *Attorney, Agent, or Firm* — L. C. Begin & Associates, PLLC (57) ABSTRACT

An airbag includes at least one panel defining an interior of the airbag, and a divider positioned in the interior so as to divide the interior into a first chamber and a second chamber. The divider includes at least one divider opening enabling fluid communication between the first and second chambers. A valve mechanism is operatively coupled to the divider and has a first cover structured to restrict gas flow from the second chamber into the divider opening. The first cover has an opening. A second cover is attached to the first cover and is structured to restrict gas flow through the first cover opening in a direction from the first chamber toward the second chamber.

20 Claims, 4 Drawing Sheets

(56) References Cited

U.S. PATENT DOCUMENTS

| | | |
|---|---|---|
| 2001/0015546 A1 | 8/2001 | Kato |
| 2004/0119271 A1 | 6/2004 | Webber |
| 2009/0152846 A1* | 6/2009 | Choi ............................ 280/729 |
| 2010/0001495 A1* | 1/2010 | Sekino et al. ................ 280/729 |
| 2010/0133797 A1 | 6/2010 | Kim et al. |
| 2010/0225094 A1 | 9/2010 | Rose et al. |
| 2010/0244419 A1 | 9/2010 | Maripudi |
| 2011/0260431 A1 | 10/2011 | Kwon |
| 2012/0025497 A1 | 2/2012 | Yoo |
| 2012/0112441 A1 | 5/2012 | Ohara |
| 2012/0248746 A1 | 10/2012 | Yamamoto |
| 2013/0020787 A1 | 1/2013 | Abele et al. |
| 2014/0151985 A1* | 6/2014 | Hotta et al. ................ 280/730.2 |
| 2014/0246846 A1* | 9/2014 | Anderson ................ 280/743.2 |
| 2014/0306433 A1* | 10/2014 | Anderson et al. ............. 280/729 |
| 2015/0021887 A1* | 1/2015 | Hiraiwa et al. ............. 280/729 |

* cited by examiner

FIG-8 ically planar (when the airbag 10 is not inflated).
TWO-WAY VALVE FOR MULTI-CHAMBERED AIRBAGS

CROSS-REFERENCE TO RELATED APPLICATIONS

This application claims the benefit of U.S. Provisional Application Ser. No. 61/810,481, filed on Apr. 10, 2013, the disclosure of which is incorporated herein by reference in its entirety.

BACKGROUND OF THE INVENTION

The embodiments described herein relate a valve mechanism structured to restricting gas flow between interior chambers of a multi-chamber airbag.

To achieve a desired inflation profile and occupant cushioning effect in certain designs of multi-chamber vehicle airbags, it is sometimes necessary to selectively restrict gas flow between the airbag chambers. This may be achieved by incorporating a flow control valve mechanism into the airbag to regulate gas flow between the chambers in a desired manner. In some applications, it is desirable to ensure that gas flows from a first chamber into a second chamber at a first flow rate, while also ensuring that any flow from the second chamber back into the first chamber occurs at a second rate different from the first flow rate. Thus, an ongoing need exists or a valve mechanism that enables such asymmetric gas flow rates to be achieved and adjusted for particular applications as well as for different sizes or masses of occupants.

SUMMARY OF THE INVENTION

In one aspect of the embodiments described herein, an airbag is provided including at least one panel defining an interior of the airbag, and a divider positioned in the interior so as to divide the interior into a first chamber and a second chamber. The divider includes at least one divider opening enabling fluid communication between the first and second chambers. A valve mechanism is operatively coupled to the divider and has a first cover structured to restrict gas flow from the second chamber into the divider opening. The first cover has an opening. A second cover is attached to the first cover and is structured to restrict gas flow through the first cover opening in a direction from the first chamber toward the second chamber.

In another aspect of the embodiments of the described herein, a divider panel for an airbag is provided. The panel includes at least one divider opening. A valve mechanism is operatively coupled to the panel and has a first cover positioned along a first side of the panel. The first cover is structured to restrict gas flow from the first side of the panel into the divider opening. The first cover has an opening. A second cover is positioned along a first side of the first cover and is structured to restrict gas flow from the first cover first side into the first cover opening.

DETAILED DESCRIPTION

Embodiments herein are described with reference to the drawings. One of ordinary skill in the art will appreciate the various aspects of airbag design, construction and operation applicable to the embodiments described herein. U.S. Pat. Nos. 6,886,857, 7,857,347, 8,128,124, and 8,322,748, for example, describe many such aspects and are incorporated herein by reference in their entirety, but not by way of limitation.

Figure 1:
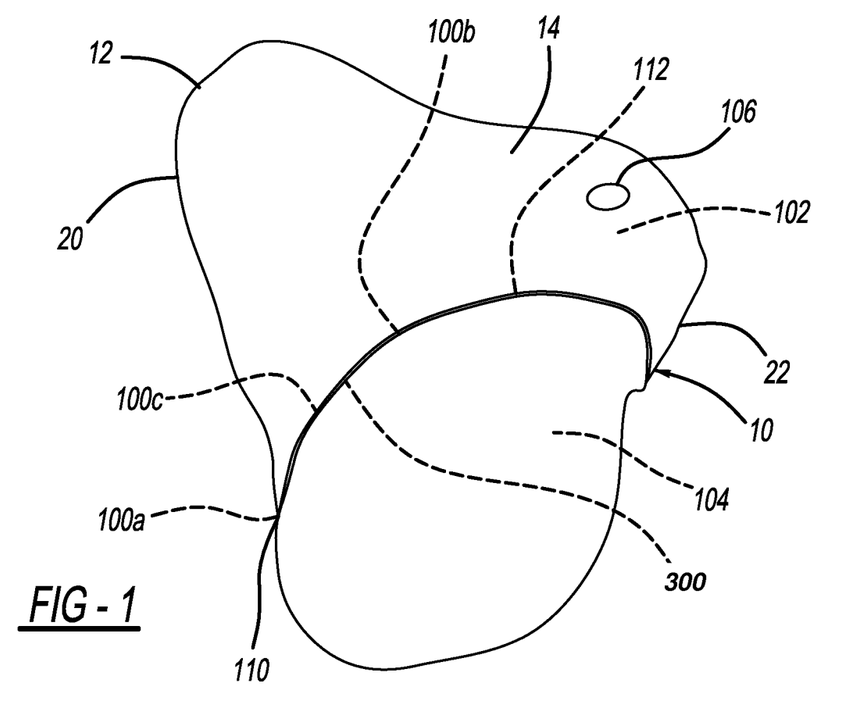
FIG. 1 is a side view of one embodiment of a passenger-side airbag (in an inflated state).
Figure 2:
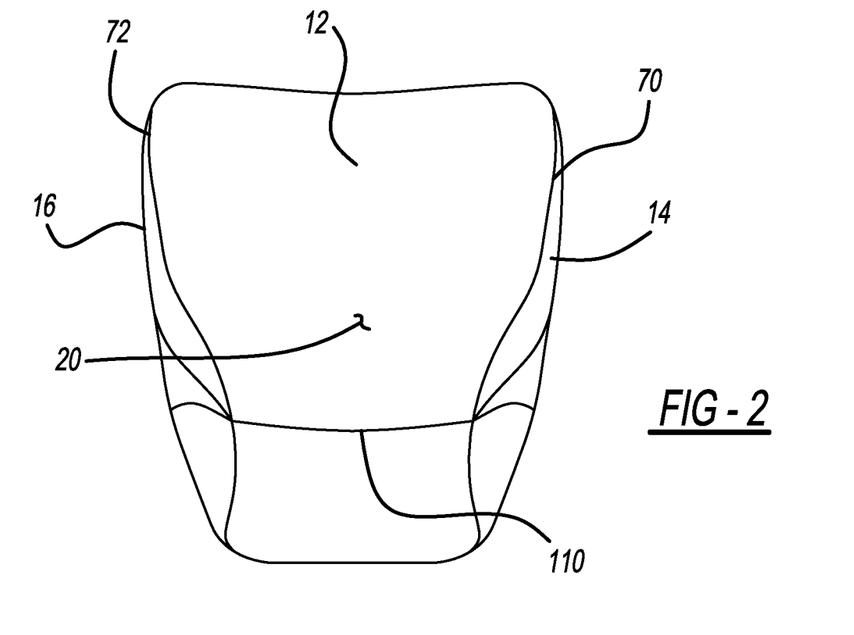
FIG. 2 is a front view of the airbag of FIG. 1.
Figure 3:
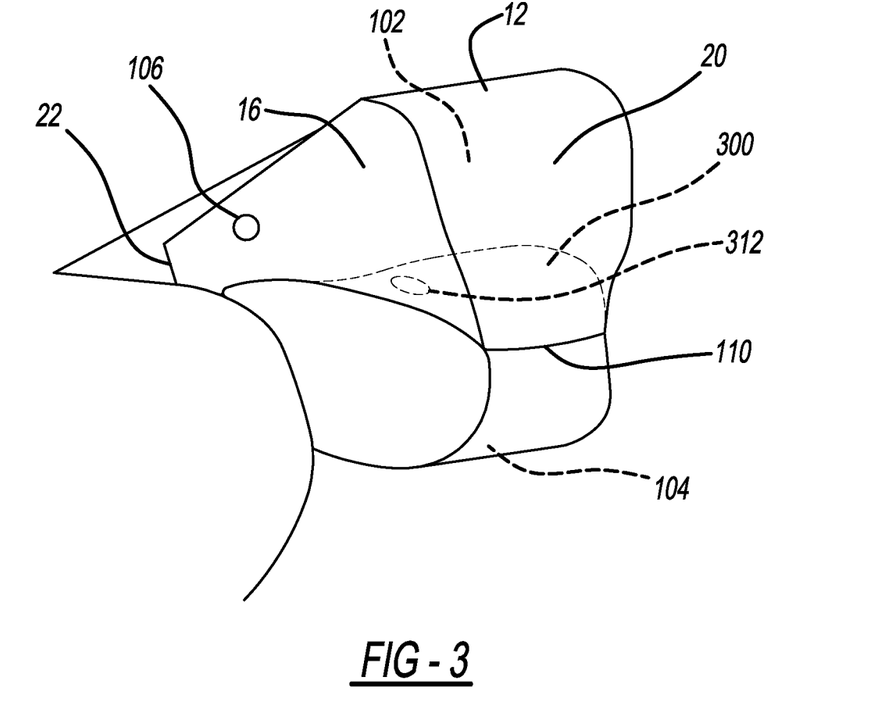
FIG. 3 is a schematic perspective view of the airbag of FIG. 1, showing elements of the airbag interior.
Figure 4:
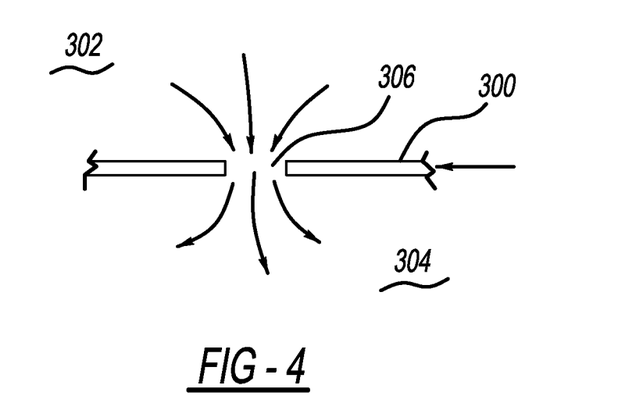
FIG. 4 shows a schematic representation of gas flow from the upper chamber through divider opening 306 and into lower chamber 304.
Figure 5:
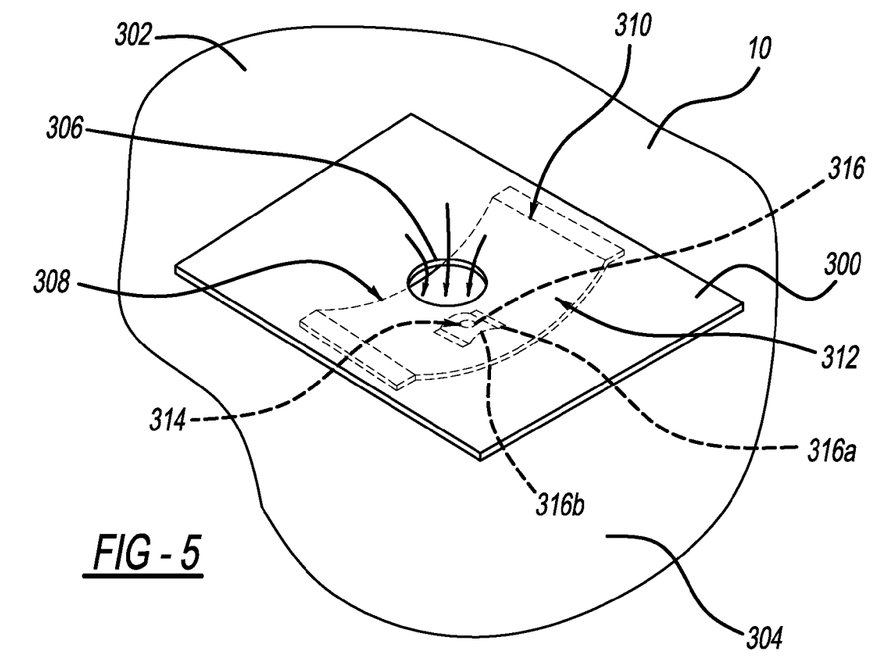
FIG. 5 is a perspective view of a portion of an interior of an airbag incorporating one embodiment of a divider and valve mechanism described herein.
Figure 6:
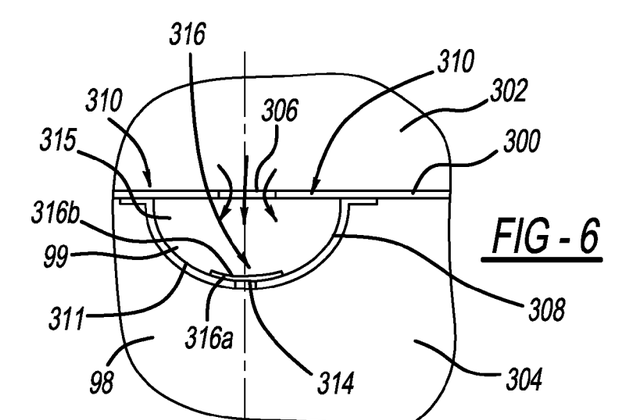
FIG. 6 is a cross-sectional side view of a portion of the airbag shown in FIG. 5 during flow of gases from an upper chamber of the airbag to a lower chamber of the airbag.
Figure 6A:
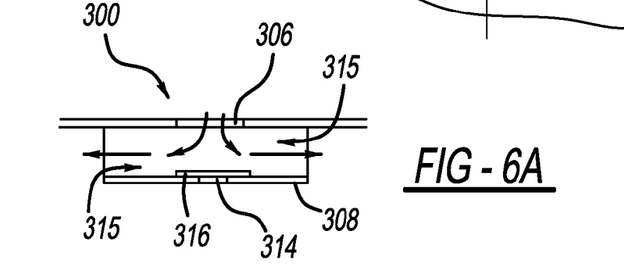
FIG. 6A is a cross-sectional front view of the portion of the airbag shown in FIG. 6.

FIGS. 1-3 are views of one embodiment of a passenger-side airbag 10 (in an inflated state). The airbag embodiment shown in FIGS. 1-4 is formed from three panels. Specifically, the airbag is formed of a main panel 12, a right side (when viewing the airbag from a seated position) panel 14, and a left side panel 16 opposite the right side panel 14. Each of the side panels 14, 16 is generally planar (when the airbag 10 is not inflated). The main panel 12 connects the left and right panels and wraps around the airbag 10. As a result, the entirety of the right edge of the main panel 12 is connected along a seam 70 (e.g., by stitching, sewing, or other suitable means) to the right panel 14 and the entirety of the left edge of the main panel 12 is connected along a seam 72 (e.g., by stitching, sewing, or other suitable means) to the left panel 16.

The main panel 12 has both a front, impact side 20 and a rear, inflation side 22. After wrapping around the airbag 10, ends of the main panel 12 are joined at the rear inflation side. In addition, the rear inflation side 22 has slits (not shown) which are sized to receive an inflator (not shown), and may also include holes (not shown) which are sized to receive bolts (or other suitable fasteners) that are configured to secure the airbag 10 to the body of an automobile (or other device). The "front side" of the airbag or of main and 12 is that portion of the airbag structured and positioned so as to be impacted first by a vehicle occupant when the airbag is activated.

Portions of one or more of panels 12, 14, 16 defining upper chamber 302 incorporate one or more vents 106 therein to release gas from the upper chamber to the environment exterior of the airbag in a controlled manner during contact between a passenger and the airbag.

Referring to FIGS. 1-4, a divider 300 is stitched or otherwise suitably attached along a perimeter thereof to interior surfaces of the main, left and right panels. The divider 300 is attached to the panel interior surfaces along a seam 110 so as to restrict gas flow between the divider and the panels to which it is attached. In a particular embodiment, the divider 300 is attached to the panel interior surfaces along seam 110 so as to form a gas-tight seal between the divider and the panels to which it is attached. Divider 300 divides the airbag interior into an upper chamber 102 and a lower chamber 104.

Referring to FIGS. 1-4, edge 100a of divider 300 attached to an interior surface of the front side 20 of main panel 12 defines a leading edge 300a of the divider 300. FIG. 3 shows the airbag embodiment of FIGS. 1-4 in an inflated state and mounted in a vehicle.

An inter-chamber venting system is provided to permit gas to flow from the upper chamber into the lower chamber to rapidly fill the lower chamber, and also for controlling or restricting backflow from the lower chamber 304 back into the upper chamber 302. In one embodiment, a flow restriction valve 312 mechanism (shown schematically in FIG. 3) is incorporated into or otherwise operatively coupled to divider 300 for controlling flow between the upper and lower chambers. In the embodiments shown, the valve facilitates gas flow from the upper chamber into the lower chamber, and restricts backflow from the lower chamber into the upper chamber. The valve may be structured such that an actuation response time of the valve in attenuating or impeding gas flow from lower chamber 304 into upper chamber 302 is proportional to the pressure differential between the upper and lower chambers. The valve may also be structured such that a backflow rate of gases through the valve and into the upper chamber is proportional to the pressure differential between the upper and lower chambers.

FIGS. 5-7A illustrate a divider 300 and one particular embodiment of a two-way flow restriction valve mechanism 312 that controls the flow of gas from the upper chamber 302 to the lower chamber 304, and then from the lower chamber back to the upper chamber.

As shown in FIGS. 5-7A, a fabric two-way valve 312 is sewn or otherwise attached to divider panel 300 (constructed as described above) and connects the upper and lower chambers to both facilitate and restrict fluid flow between the upper chamber 302 and the lower chamber 304. A main orifice or divider opening 306 is firmed within the dividing panel 300 and facilitates the flow of inflator gas between the upper chamber 302 and the lower chamber 304. A first valve cover 308 may be formed from the same fabric as the divider 300, whereby the first valve cover 308 is attached to the underside of divider panel 300 (i.e., the side of the divider facing and residing within lower chamber 304) at first divider attachment seams 310, and is structured to overlap and cover the main orifice 306 when the pressure in lower chamber 304 is higher than the pressure in upper chamber 302. First cover 308 is also structured to restrict gas flow from the second chamber 304 into the divider opening 306, in the manner described below. First gas pathways 315 are defined between the first valve cover 308 and the divider panel 300, whereby initial gas flow from the upper chamber 302 is diverted or channeled through the first gas pathways 315 about the first valve cover 308 and into the lower chamber 304.

A second orifice or opening 314 is formed in the first valve cover 308 thereby enabling fluid communication from the lower chamber 304 back into the upper chamber 302 subsequent to the initial transfer of gas from the upper chamber to the lower chamber. A second valve cover 316 is sewn or otherwise attached along second attachment seams 318 to the first valve cover 308, along a side of the first cover 308 facing the divider 300. Second valve cover 316 is structured to overlap and cover the second orifice 314 thereby restricting gas flow through the first cover opening 314 in a direction leading from the first chamber toward the second chamber 304. Second gas pathways 320 are defined between the second valve cover 316 and the first valve cover 308, whereby secondary gas flow from the lower chamber 304 is channeled through the second gas pathways 320 through the main orifice 306 and back into upper chamber 302.

Referring to FIGS. 6A-7A, second valve cover 316 has an attachment portion 316a by which the second cover 316 is attached to first cover 306 (along a seam, for example) and a body portion 316b coupled to the attachment portion 316a. Body portion 316b is structured to contact the first cover 308 so as to cover and overlap the first cover opening 314, so as to restrict gas flow from a first side 99 of the first cover 308 into the first cover opening 314 when a gas pressure on the first side 99 of the first cover 308 is greater than a pressure on the second side of the first cover.

Prior to bag deployment, airbag 10 is operatively coupled to an associated gas generating system or other inflation fluid source (not shown), in a manner known in the art. The inflation fluid source may be operatively coupled to a collision event sensor (for example, sensor 910 shown in FIG. 8) that includes (or is in operative communication with) a controller (not shown) which signals activation of the airbag system in the event of a collision.

In operation, an associated inflator 915 (FIG. 8) (exemplified in the other embodiments and in the prior art) is actuated upon a crash or collision event. The airbag 10 and its associated inflation means are configured to provide rapid inflation of the airbag (and especially upper chamber 302) so as quickly engage and cushion the forward-moving head &, neck region and (at a slightly later point in time) the thoracic region of the passenger, while utilizing a singular cushion volume to aid in reducing the inertia of the individual.

Referring now to the drawings, when the system is activated, inflation gas flows from the inflation fluid source into upper chamber 302, rapidly inflating the upper chamber to enable this chamber to intercept the forward-moving head and neck regions as soon as possible, to aid in absorbing the momentum built up by the head and neck regions.

Inflation gas initially fills the upper chamber 302 and then flows through the divider opening or main orifice 306 and through first gas pathways 315, and then into lower chamber 304 to pressurize the lower chamber for supporting the occupant thoracic region.

Figure 7:
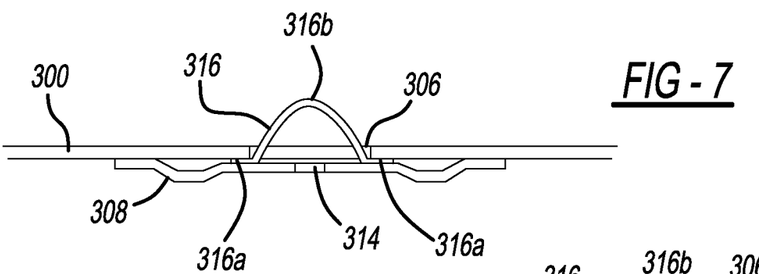
FIG. 7 is a cross-sectional side view of the portion of the airbag shown in FIG. 6 during flow of gases from the lower chamber of the airbag to the upper chamber of the airbag.
Figure 7A:
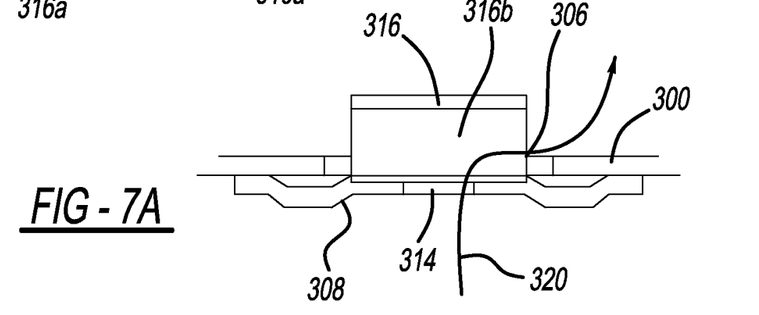
FIG. 7A is a cross-sectional front view of the portion of the airbag shown in FIG. 7.

Referring to FIGS. 7 and 7A, when the lower chamber is filled, valve 312 actuates responsive to pressure in lower chamber 304 to attenuate or restrict the flow of gas back into the upper chamber 302. That is, as pressure increases within the lower chamber 304 to a point where a pressure in the second chamber 304 is greater than a pressure in the first chamber 302, the first valve cover 308 is forced by the increased pressure into contact with divider 300 to cover and overlap the main orifice 306, thereby attenuating the backflow from the lower chamber 304 back into the upper chamber 302, and simultaneously and substantially occluding the gas flow through first gas pathways 315.

However, once the vehicle occupant (not shown) makes physical contact with the airbag 10, the outer pressure from the occupant increases the gas pressure within the lower chamber 304. The increased, pressure within lower chamber 304 exerts a three on the second valve cover 316 that "lifts" the second valve cover 316 from its closed position (pressed against first cover 308 and covering the second orifice 314 during flow of gases from the upper chamber through opening 306 into lower chamber 304), to an "open" position, enabling but restricting gas flow through the first cover opening 314 in a direction from the second chamber 304 toward the first chamber 302. As the second valve cover 316 is "lifted" as shown in FIGS. 7 and 7A, a secondary gas flow is facilitated through second gas pathways 320 and then upward and into first chamber 302. This backflow of gases reduces the pressure inside lower chamber 304, thereby "softening" the airbag response on the vehicle occupant. Thus, the embodiment of FIGS. 4-7A may be configured to provide an inflation profile of the airbag 10 whereby the inflation pressure in the lower chamber 304 is softened over time, thereby affecting as softer deployment if desired.

In sum, the particular embodiment just described may be characterized as:

an airbag comprising a first chamber and a second chamber;

a perforated dividing panel attached to an inner wall of the airbag thereby providing the first chamber and the second chamber, the perforated dividing panel containing at least one main orifice;

a valve for two-way fluid communication between the first chamber and the second chamber, the valve providing fluid communication through the at least one main orifice;

a first valve cover attached to the dividing panel for covering the at least one main orifice, the first valve cover facilitating fluid flow from the upper chamber to the lower chamber and attenuating fluid flow from the lower chamber into the upper chamber;

at least one optional second orifice formed in the first valve cover, the second orifice selectively sealed during actuation of the airbag; and an optional second valve cover attached to the first valve cover for covering the at least one optional second orifice, the optional second valve cover facilitating fluid flow from the lower chamber into the upper chamber.

By sizing second opening 314 to be relatively smaller than the first opening 306, the particular valve embodiment 312 previously described may be configured such that, if the thorax region of a relatively larger, heavier occupant impacts the portion of the airbag exterior enclosing the lower chamber, the pressure in the lower chamber rises relatively rapidly, causing the valve 312 to actuate relatively quickly to restrict gas flow back into the upper chamber, and temporarily overwhelming or exceeding the gas backflow capacity of the second opening 314, thereby maintaining a relatively higher pressure in the lower chamber for a longer period. This higher pressure stiffens the airbag and helps to cushion and absorb the relatively greater mass of the heavier occupant. However, if the thorax region of a relatively smaller or lighter occupant impacts the portion of the airbag exterior enclosing the lower chamber, the pressure in the lower chamber rises relatively more slowly, causing the valve 312 to actuate more slowly to restrict gas flow back into the upper chamber. In addition, the gas backflow rate through the relatively smaller opening 314 is less than in the case of the sudden and higher lower chamber pressure spike applied by contact with the heavier occupant. This enables the lower chamber pressure to fall to a relatively lower level more quickly, causing the lower portion of the bag to be less stiff in cushioning and absorbing the relatively smaller mass of the lighter occupant. As gases are forced from the lower chamber into the upper chamber through the valve 312, the lower chamber of the airbag continues to deflate and deflect so as to absorb energy.

In the same manner, as the passenger head and neck regions contact the airbag, gases already residing in the upper chamber 302 and gases received in the upper chamber from the inflator and gases received through the valve 312 via backflow from the lower chamber are vented to the bag exterior through the upper chamber vents 106 (shown schematically in FIG. 1), resulting in a reduction of upper chamber pressure and a "softening" of the bag front surface over the upper chamber, responsive to contact with the passenger's head and neck regions. This softening aids in providing support sufficient to protect the occupant's head and neck region, while helping to minimize the contact forces between the head/neck region and the airbag.

Thus, the stiffness of the airbag responsive to bodily contact may be adjusted by modifying the flow characteristics of the valve 312 connecting the upper and lower chambers. The stiffness of the lower chamber 304 may be reduced by modifying the valve 312 so as to permit a relatively greater flowrate of gas back into the upper chamber 302 responsive to pressure exerted on the lower chamber by the vehicle occupant. Conversely, the stiffness of the lower chamber 304 may be increased by modifying the valve 312 so as to permit only a relatively lower flowrate of gas back into the upper chamber 302 responsive to pressure exerted on the lower chamber by the vehicle occupant.

In a particular embodiment, it has been found that a total area of the opening 306 within a range of 700 square millimeters (achievable using, for example, one circular opening of approximately 15 mm radius) to 32,000 square millimeters (achievable using, for example, one circular opening of approximately 100 millimeters radius opening) is desirable for helping to ensure that airbag performance is within an optimum range. In embodiments described herein, which use a directional valve mechanism to facilitate inflow and restrict backflow from the lower chamber to the upper chamber as previously described, the area of the divider opening 306 may need to be at or near an upper end of this range of opening sizes 700 to 32,000 square millimeters, to provide the necessary inflation profile given the reduction in flow caused by turbulence and friction in the gases as they flow through the opening 306 and interact with the various portions of the valve.

In one embodiment, the opening 306 is circular. However, the divider opening(s) can have any desired shape, as long as the total area of the opening(s) is within the range specified above.

In a particular embodiment, it has also been found that a total area of the opening 314 within a range of 200 square millimeters (achievable using, for example, one circular opening of approximately 8 millimeters radius) to 18,000 square millimeters (achievable using, for example, one circular opening of approximately 76 millimeters radius opening) is desirable for helping to ensure that airbag performance is within an optimum range. In embodiments described herein, which use a directional valve mechanism to facilitate inflow and restrict backflow from the lower chamber to the upper chamber as previously described, the area of the divider opening 314 may need to be at or near an upper end of this range of opening sizes 200 to 18,000 square millimeters, to provide the necessary inflation profile given the reduction in flow caused by turbulence and friction in the gases as they flow through the opening 314 and interact with the various portions of the valve.

In one embodiment, the opening 314 is circular. However, the first cover opening(s) can have any desired shape, as long as the total area of the opening(s) is within the range specified above.

Once equilibrium is substantially reached between the upper and lower chamber pressures, flow from one chamber to the other is reduced. As the occupant begins to load the lower chamber of the cushion, the pressure within the lower chamber increases, causing the first cover 308 of the valve to restrict the backflow of gas from the lower chamber to the upper chamber via first cover opening 314. This restricted flow now is effectively absorbing energy from the occupant interaction with the bag lower chamber. The flow restriction can also be adjusted or tuned in order to absorb the occupant energy as required for a particular application, by adjusting valve parameters such as the size of opening 314. In the later phases of the occupant loading of the cushion, backflow from the lower chamber goes into the upper chamber and then the gas is discharged from the upper chamber into the environment through the main vents 106 located in the wall of the upper chamber 302.

Figure 8:
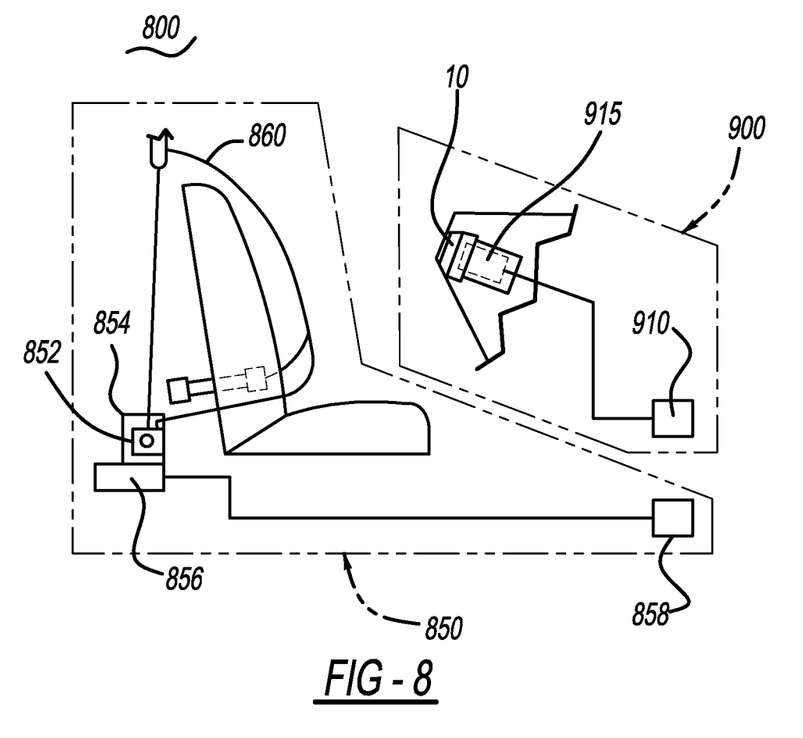
FIG. 8 is a view of a vehicle occupant protection system incorporating an airbag with a valve mechanism in accordance with an embodiment described herein.

Referring now to FIG. 8, an embodiment 10 of the airbag described herein may be incorporated into an airbag system 900. Airbag system 900 includes at least one gas source 915 (for example, a known inflator or gas generating system) and airbag 10 in accordance with an embodiment described herein. The airbag is operatively coupled to the gas source so as to enable fluid communication therewith upon activation of the gas generating system. Airbag system 900 may also include (or be in communication with) a collision event sensor 910. Collision event sensor 910 includes a known collision sensor algorithm that prompts actuation of airbag system 900 via, for example, activation of gas source 915 in the event of a collision.

Referring again to FIG. 8, airbag system 900 may also be incorporated into a broader, more comprehensive vehicle occupant protection system 800 including additional elements such as is safety belt assembly 850. FIG. 8 shows a schematic diagram of one exemplary embodiment of such a protection system. Safety belt assembly 850 includes a safety belt housing 852 and a safety belt 860 extending from housing 852. A safety belt retractor mechanism 854 (for example, a spring-loaded mechanism) may be coupled to an end portion of the belt. In addition, a known safety belt pretensioner 856 may be coupled to belt retractor mechanism 854 to actuate the retractor mechanism in the event of a collision. Typical seat belt retractor mechanisms which may be used in conjunction with the safety belt embodiments described herein are disclosed in U.S. Pat. Nos. 5,743,480, 5,553,803, 5,667,161, 5,451,008, 4,558,832 and 4,597,546, incorporated herein by reference. Illustrative examples of typical pretensioners with which the safety belt embodiments may be combined are described in U.S. Pat. Nos. 6,505,790 and 6,419,177, incorporated herein by reference.

Safety belt assembly 850 may also include (or be in communication with) a collision event sensor 858 (for example, an inertia sensor or an accelerometer) including a known collision sensor algorithm that prompts actuation of belt pretensioner 856 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the embodiments as recited in the appended claims.

It should be noted that the term "exemplary" as used herein to describe various embodiments is intended to indicate that such embodiments are possible examples, representations, and/or illustrations of possible embodiments and such term is not intended to connote that such embodiments are necessarily extraordinary or superlative examples.

The terms "coupled," "connected," and the like as used herein means the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements, for example "top," "bottom," "above," "below," etc., are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the airbag as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosure herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the exemplary embodiments.

What is claimed is:

1. An airbag comprising:
   at least one panel defining an interior of the airbag, and
   a divider positioned in the interior so as to divide the interior into a first chamber and a second chamber the divider including at least one divider opening enabling fluid communication between the first and second chambers; and
   a valve mechanism operatively coupled to the divider and having a first cover structured to restrict gas flow from the second chamber into the divider opening, the first cover having an opening, and
   a second cover attached to the first cover and structured to restrict gas flow through the first cover opening in a direction from the first chamber toward the second chamber,
   wherein an area of the first cover opening is less than an area of the at least one divider opening.

2. The airbag of claim 1 wherein the first cover is attached to the divider along a side of the divider facing the second chamber.

3. The airbag of claim 1 wherein the second cover is attached to the first cover along a side of the first cover facing the divider.

4. The airbag of claim 1 wherein the first cover is structured to contact the divider so as to cover and overlap the at least one divider opening so as to restrict gas flow from the second chamber into the at least one divider opening, when a pressure in the second chamber is greater than a pressure in the first chamber.

5. The airbag of claim 4 wherein a portion of the first cover is structured to move in a direction away from the at least one divider opening by a flow of gas from the first chamber into the at least one divider opening.

6. The airbag of claim 1 wherein the second cover is structured to contact the first cover so as to cover and overlap the first cover opening so as to restrict gas flow through the first cover opening in a direction from the first chamber toward the second chamber, when a pressure in the first chamber is greater than a pressure in the second chamber.

7. The airbag of claim 6 wherein a portion of the second cover is structured to be urged in a direction away from the first cover opening by a flow of gas through the first cover opening in a direction from the second chamber toward the first chamber.

8. An airbag system comprising an airbag in accordance with claim 1.

9. A vehicle occupant safety system comprising an airbag in accordance with claim 1.

10. A divider panel for an airbag, the panel comprising:
   at least one divider opening; and
   a valve mechanism operatively coupled to the panel and having a first cover positioned along a first side of the panel, the first cover being structured to restrict gas flow from the first side of the panel into the divider opening, the first cover having an opening, and a second cover positioned along a first side of the first cover and structured to restrict gas flow from the first cover first side into the first cover opening,
   wherein an area of the first cover opening is less than an area of the at least one divider opening.

11. The divider panel of claim 10 wherein the first cover comprises:
   at least one attachment portion attached to the divider panel; and
   a body portion coupled to the at least one attachment portion and structured to contact the divider so as to cover and overlap the at least one divider opening (306) so as to restrict gas flow from the first side of the panel into the at least one divider opening when a pressure on the first side of the panel is greater than a pressure on a second side of the panel opposite the first side.

12. The divider panel of claim 11 wherein the first cover body portion is structured to move in a direction away from the at least one divider opening when the pressure on the second side of the panel is greater than the pressure on the first side of the panel.

13. The divider panel of claim 10 wherein the second cover comprises:
   an attachment portion attached to the first cover; and
   a body portion coupled to the attachment portion and structured to contact the first cover so as to cover and overlap the first cover opening so as to restrict gas flow from the first side of the first cover into the first cover opening when a pressure on a second side of the panel opposite the first side is greater than a pressure on the first side of the panel.

14. The divider panel of claim 13 wherein the second cover body portion is structured to move in a direction away from the first cover opening when the pressure on the first side of the panel is greater than the pressure on the second side of the panel.

15. The divider panel of claim 10 wherein an area of the first cover opening is less than an area of the at least one divider opening.

16. An airbag comprising a divider panel in accordance with claim 10.

17. An airbag system comprising an airbag in accordance with claim 16.

18. A vehicle occupant safety system comprising an airbag in accordance with claim 16.

19. The airbag of claim 1 wherein the at least one divider opening has an area of within the range 700 square millimeters to 32,000 square millimeters, inclusive.

20. The airbag of claim 1 wherein the first cover opening has an area of within the range 200 square millimeters to 18,000 square millimeters, inclusive.

* * * * *